United States Patent
Feng

(10) Patent No.: US 9,372,317 B1
(45) Date of Patent: Jun. 21, 2016

(54) TEMPERATURE CONTROL OF A COMPONENT ON AN OPTICAL DEVICE

(71) Applicant: Kotura, Inc., Monterey Park, CA (US)

(72) Inventor: Dazeng Feng, El Monte, CA (US)

(73) Assignee: Mellanox Technologies Silicon Photonics Inc., Monterey Park, CA (US)

( * ) Notice: Subject to any disclaimer, the term of this patent is extended or adjusted under 35 U.S.C. 154(b) by 0 days.

(21) Appl. No.: 14/337,822

(22) Filed: Jul. 22, 2014

(51) Int. Cl.
*G02B 6/13* (2006.01)
*G02B 6/44* (2006.01)
*G02B 6/10* (2006.01)
*G01D 5/353* (2006.01)

(52) U.S. Cl.
CPC .............. *G02B 6/4436* (2013.01); *G01D 5/353* (2013.01); *G02B 6/10* (2013.01)

(58) Field of Classification Search
CPC ................... G02B 6/12002; G02B 6/12004
See application file for complete search history.

(56) References Cited

U.S. PATENT DOCUMENTS

| 4,640,156 A | 2/1987 | Nakagawa et al. |
| 7,333,689 B2 * | 2/2008 | Menon .................... B82Y 20/00 385/131 |
| 2013/0016942 A1 | 1/2013 | Gubenko et al. |

FOREIGN PATENT DOCUMENTS

| EP | 1189081 | * 12/2001 | .............. G02B 6/13 |
| WO | WO2014020730 | * 8/2012 | .............. G02B 6/13 |
| WO | 2013/169298 | 11/2013 | |

* cited by examiner

*Primary Examiner* — Tony Ko
(74) *Attorney, Agent, or Firm* — Gavrilovich, Dodd & Lindsey, LLP

(57) ABSTRACT

The optical includes a waveguide positioned on a base and an optical component positioned on the base. The optical component is a light sensor that includes an active medium or a modulator that includes an active medium. The waveguide is configured to guide a light signal through the component such that the light signal is guided through the active medium. The device includes one or more heat control features selected from the group consisting of: placing one or more thermal conductors over a lateral side of a ridge of the active medium; extending thermal conductors from within the active component to a location outside of the active component, and tapering the ridge of the active medium within the perimeter of the active component.

17 Claims, 8 Drawing Sheets

TEMPERATURE CONTROL OF A COMPONENT ON AN OPTICAL DEVICE

FIELD

The present invention relates to optical devices and particularly, to temperature control of optical devices.

BACKGROUND

Optical links transmit light signals from a receiver to a transmitter. Increasing the power of the light signals can increase the length of these links. Components such as light sensors and modulators are often used in these links; however, there is often a limit to the level of optical power that can be handled by these components. For instance, light sensors and modulators both generate a photocurrent during operation. This photocurrent leads to substantial heating of the component. As the power level of the optical signals increases, the level of heating also increases. This heating can damage the component and cause other difficulties. For instance, the operating wavelength of the modulator shifts in response to this heating. As a result, the efficiency of the modulator drops as the heating level increases. As a result, there is a need for optical components that are suitable for use with increased optical power levels.

SUMMARY

An optical device includes a waveguide positioned on a base and an active component positioned on the base. The active component includes a ridge of an active medium positioned on the base. The ridge of active medium includes lateral sides between a top and a bottom. The bottom of the ridge is between the top of the ridge and the base. The waveguide is configured to guide a light signal through the active component such that the light signal is guided through the ridge of the active medium. A thermal conductor includes a lateral portion positioned over a lateral side of the ridge of the active medium. The thermal conductor also includes a slab portion positioned over the base and extending away from the ridge of active medium.

Another embodiment of the optical device includes a waveguide positioned on a base and an active component positioned on the base. The active component includes a ridge of an active medium positioned on the base. The waveguide is configured to guide a light signal through the active component such that the light signal is guided through the ridge of the active medium. A thermal conductor is positioned such that the active medium is between the thermal conductor and the base. The thermal conductor extends to a location where the active medium is not between the thermal conductor and the base. In some instances, the thermal conductor has at least one or at least two dimensions larger than 5 μm.

Another embodiment of the optical device includes a waveguide positioned on a base and an active component positioned on the base. The active component includes a ridge of an active medium positioned on the base. The waveguide is configured to guide a light signal through the active component such that the light signal is guided through the ridge of the active medium. At least a portion of the ridge of active medium includes a taper.

BRIEF DESCRIPTION OF THE FIGURES

FIG. 1A is a perspective view of the device.

FIG. 1B is a cross section of the device taken along the line labeled B in FIG. 1A.

FIG. 2A is a topview of the device.

FIG. 2B is a cross-section of the device shown in FIG. 2A taken along the line labeled B in FIG. 2A.

FIG. 2C is a cross-section of the device shown in FIG. 2A taken along the line labeled C in FIG. 2A.

FIG. 2D is a cross-section of the device shown in FIG. 2A taken along the line labeled D in FIG. 2A.

FIG. 3A is a topview of the device.

FIG. 3B is a cross-section of the device shown in FIG. 3A taken along the line labeled B in FIG. 3A.

FIG. 3C is a cross-section of the device shown in FIG. 3A taken along the line labeled C in FIG. 3A.

FIG. 4A is a topview of the device.

FIG. 4B is a cross-section of the device shown in FIG. 4A taken along the line labeled B in FIG. 4A.

FIG. 4C is a cross-section of the device shown in FIG. 4A taken along the line labeled C in FIG. 4A.

FIG. 5A is a topview of the device.

FIG. 5B is a cross-section of the device shown in FIG. 5A taken along the line labeled B in FIG. 5A.

FIG. 5C is a cross-section of the device shown in FIG. 5A taken along the line labeled C in FIG. 5A.

DESCRIPTION

An optical device includes a waveguide positioned on a base and an optical component positioned on the base. The optical component is a light sensor that includes an active medium or a modulator that includes an active medium. The waveguide is configured to guide a light signal through the component such that the light signal is guided through the active medium. The device includes one or more heat control features. For instance, thermal conductors can be positioned over the active medium included in the waveguide and can extend away from the waveguide in order to guide heat away from the waveguide. Additionally or alternately, the thermal conductors can extend from a position within the perimeter of the components to a location beyond the perimeter of the component. Accordingly, the thermal conductors can guide heat generated by the component beyond the perimeter of the component. Additionally or alternately, the portion of the waveguide within the component can be tapered so as to increase the uniformity of the heat generation with the component. As a result, the taper can reduce the presence of hot spots within the component. One or more of these features allows the component to be used in conjunction with higher power light signals and can permit the use of longer optical links.

In some instances, the thermal conductors are electrically conductive and electronics use the conductors to apply to the component the electrical energy needed to operate the component. For instance, an electrical current or electrical energy needed to operate the modulator or light sensor can be driven through the thermal conductors. In these instances, the thermal conductors do not add substantial complexity to the fabrication process.

Figure 1A:
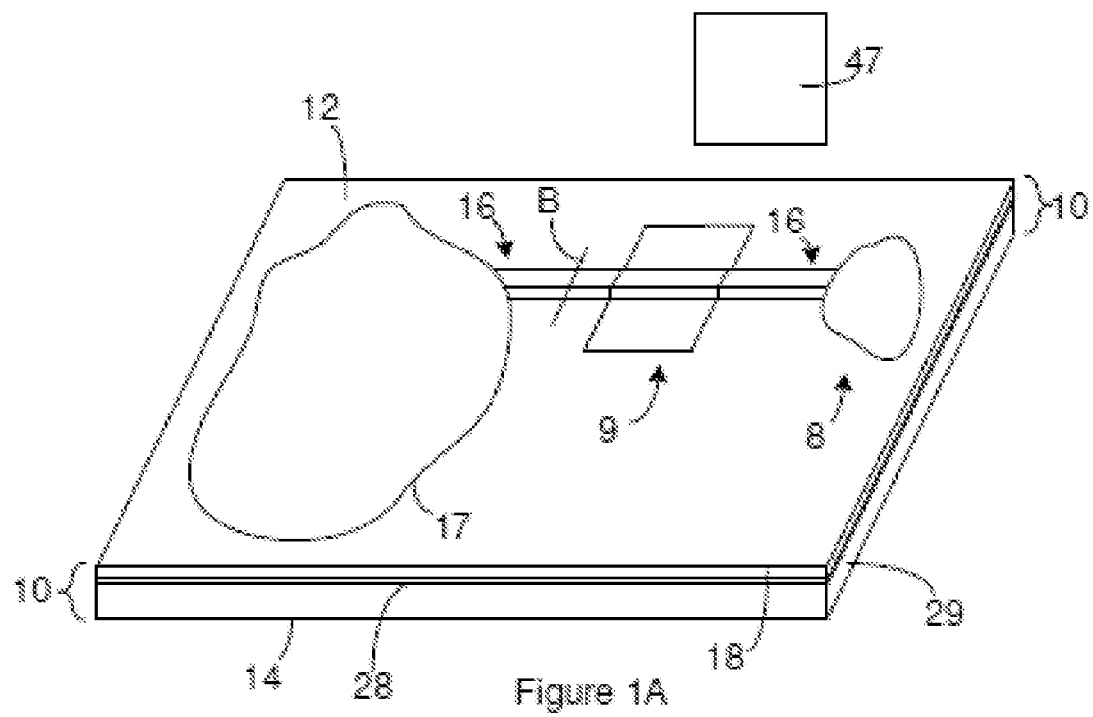
FIG. 1A and FIG. 1B illustrate an example of optical device that includes an active component. The device has a waveguide that guides a light signal between a light source and an active component.
Figure 1B:
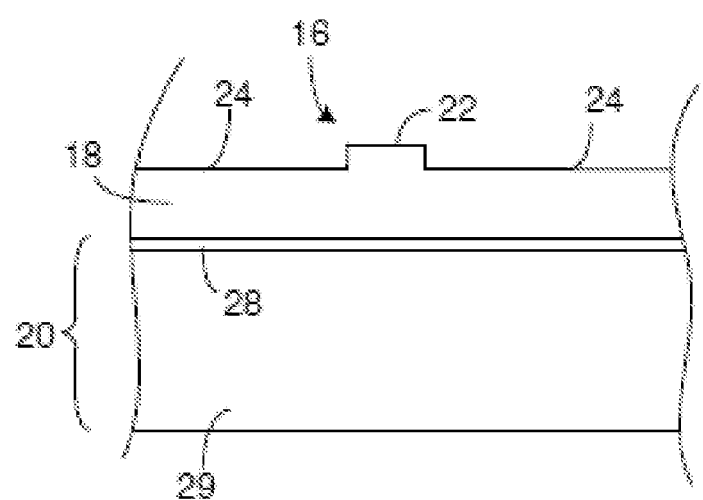

FIG. 1A and FIG. 1B illustrate an example of optical device that includes an active component. The device has a waveguide that guides a light signal between a light source 8 and an active component 9. FIG. 1A is a perspective view of the device. FIG. 1B is a cross section of the device taken along the line labeled B in FIG. 1A. FIG. 1A and FIG. 1B do not show details of either the light source 8 or the active component but illustrates the relationship between these components and the waveguide.

The device is within the class of optical devices known as planar optical devices. These devices typically include one or more waveguides immobilized relative to a substrate or a base. The direction of propagation of light signals along the waveguides is generally parallel to a plane of the device. Examples of the plane of the device include the top side of the base, the bottom side of the base, the top side of the substrate, and/or the bottom side of the substrate.

The illustrated device includes lateral sides 10 (or edges) extending from a top side 12 to a bottom side 14. The propagation direction of light signals along the length of the waveguides on a planar optical device generally extends through the lateral sides 10 of the device. The top side 12 and the bottom side 14 of the device are non-lateral sides.

The device includes one or more waveguides 16 that carry light signals to and/or from optical components 17. Examples of optical components 17 that can be included on the device include, but are not limited to, one or more components selected from a group consisting of facets through which light signals can enter and/or exit a waveguide, entry/exit ports through which light signals can enter and/or exit a waveguide from above or below the device, multiplexers for combining multiple light signals onto a single waveguide, demultiplexers for separating multiple light signals such that different light signals are received on different waveguides, optical couplers, optical switches, lasers that act as a source of a light signal, amplifiers for amplifying the intensity of a light signal, attenuators for attenuating the intensity of a light signal, modulators for modulating a signal onto a light signal, modulators that convert a light signal to an electrical signal, and vias that provide an optical pathway for a light signal traveling through the device from the bottom side 14 of the device to the top side 12 of the device. Additionally, the device can optionally, include electrical components. For instance, the device can include electrical connections for applying a potential or current to a waveguide and/or for controlling other components on the optical device.

A portion of the waveguide includes a first structure where a portion of the waveguide 16 is defined in a light-transmitting medium 18 positioned on a base 20. For instance, a portion of the waveguide 16 is partially defined by a ridge 22 extending upward from a slab region of the light-transmitting medium as shown in FIG. 1B. In some instances, the top of the slab region is defined by the bottom of trenches 24 extending partially into the light-transmitting medium 18. As will become evident below, the slab regions can be defined by a variety of different materials. For instance, when the trenches 24 extend through the light-transmitting medium 18 to the base, the ridge extends upwards from the base and the exposed portions of the base serve as the slab regions. Suitable light-transmitting media include, but are not limited to, silicon, polymers, silica, SiN, GaAs, InP and $LiNbO_3$.

The portion of the base 20 adjacent to the light-transmitting medium 18 is configured to reflect light signals from the waveguide 16 back into the waveguide 16 in order to constrain light signals in the waveguide 16. For instance, the portion of the base 20 adjacent to the light-transmitting medium 18 can be a light insulator 28 with a lower index of refraction than the light-transmitting medium 18. The drop in the index of refraction can cause reflection of a light signal from the light-transmitting medium 18 back into the light-transmitting medium 18. The base 20 can include the light insulator 28 positioned on a substrate 29. In some instances, the substrate 29 can be configured to transmit light signals. For instance, the substrate 29 can be constructed of a light-transmitting medium 18 that is different from the light-transmitting medium 18 or the same as the light-transmitting medium 18. In one example, the device is constructed on a silicon-on-insulator wafer. A silicon-on-insulator wafer includes a silicon layer that serves as the light-transmitting medium 18. The silicon-on-insulator wafer also includes a layer of silica positioned on a silicon substrate. The layer of silica can serving as the light insulator 28 and the silicon substrate can serve as the substrate 29.

Although the light source 8 is shown positioned centrally on the device, the light source 8 can be positioned at the edge of the device. The light source 8 can be any type of light source including light sources that convert electrical energy into light. Examples of suitable light sources include, but are not limited to, a semiconductor laser, and a semiconductor amplifier such as a reflection semiconducting optical amplifier (RSOA). Examples of suitable lasers include, but are not limited to, Fabry-Perot lasers, Distributed Bragg Reflector lasers (DBR lasers), Distributed FeedBack lasers (DFB lasers), external cavity lasers (ECLs). In some instances, the light source 8 is an optical fiber interfaced with a device as disclosed in any one or more of the fiber interface patents applications. In some instances, the device does not include a light source. For instance, the waveguide can terminate at a facet located at or near the perimeter of the device and a light signal traveling through air can then be injected into the waveguide through the facet. Accordingly, the light source is optional. The one or more components 17 are also optional.

Figure 2A:
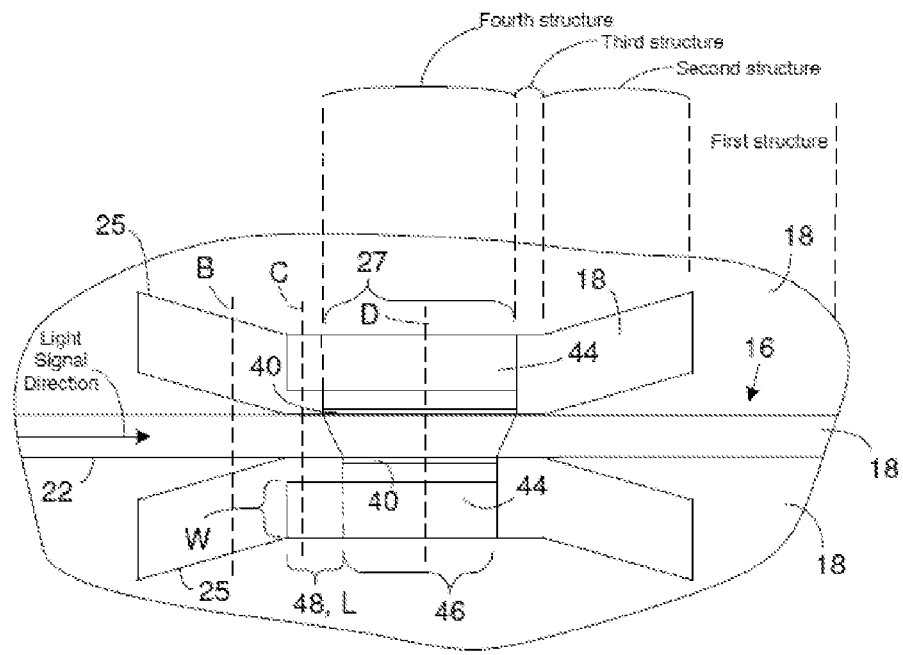
FIG. 2A through FIG. 2D illustrate a portion of a device that includes an active component that is suitable for use as the active component of FIG. 1A.
Figure 2B:
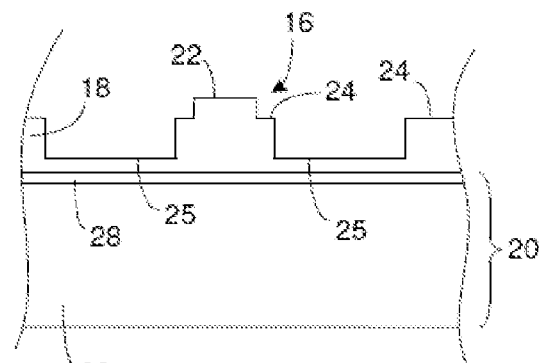
Figure 2C:
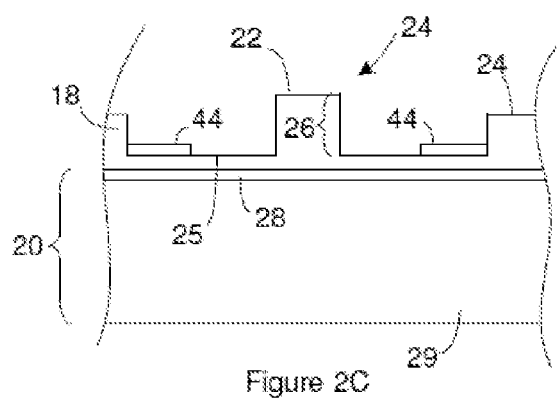
Figure 2D:
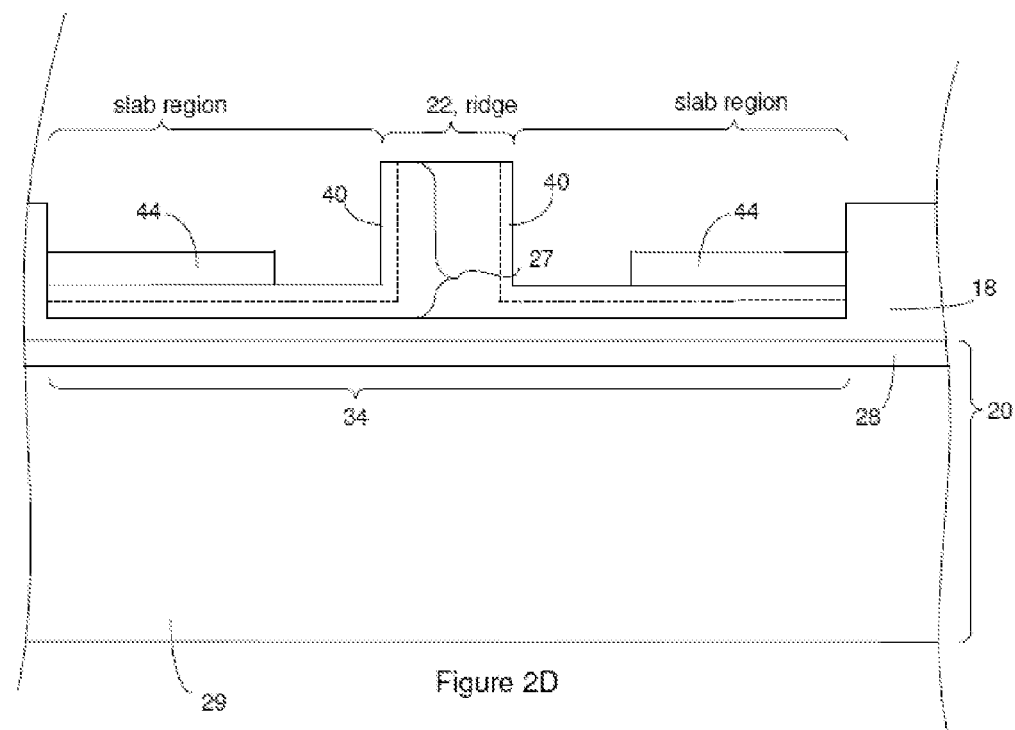

FIG. 2A through FIG. 2D illustrate a portion of a device that includes an active component that is suitable for use as the active component of FIG. 1A. FIG. 2A is a topview of the device. FIG. 2B is a cross-section of the device shown in FIG. 2A taken along the line labeled B in FIG. 2A. FIG. 2C is a cross-section of the device shown in FIG. 2A taken along the line labeled C in FIG. 2A. FIG. 2D is a cross-section of the device shown in FIG. 2A taken along the line labeled D in FIG. 2A.

Recesses 25 (FIG. 2A) extend into the bottoms of the trenches 24 in the light-transmitting medium 18 such that the ridge 22 is positioned between recesses 25. The recesses 25 can extend part way into the light-transmitting medium 18. As is evident from FIG. 2B, the recesses 25 can be spaced apart from the ridge 22. As a result, a portion of the waveguide 16 includes a second structure where an upper portion of the waveguide 16 is partially defined by the ridge 22 extending upward from the bottom of the trenches 24 (slab regions) and a lower portion of the waveguide is partially defined by recesses 25 extending into the slab regions and spaced apart from the ridge.

As shown in FIG. 2C, the recesses 25 can approach the ridge 22 such that the sides of the ridge 22 and the sides of the recesses 25 combine into a single surface 26. As a result, a portion of a waveguide includes a third structure where the waveguide is partially defined by the surface 26.

As is evident in FIG. 2A, a portion of the waveguide 16 includes an active medium 27. The active medium 27 is configured to receive the light signals from a portion of the waveguide having the third structure and to guide the received light signals to another portion of the waveguide having the third structure.

As is evident from FIG. 2D, a ridge 22 of active medium 27 extends upward from a slab region of the active medium 27. Accordingly, a portion of the waveguide includes a fourth structure configured to guide the received light signal through the active medium 27. This portion of the waveguide is partially defined by the top and lateral sides of the active medium 27. The slab regions of the active medium 27 and the ridge 22 of the active medium 27 are both positioned on a seed portion 34 of the light-transmitting medium 18. As a result, the seed portion 34 of the light-transmitting medium 18 is between the active medium 27 and the base 20. In some instances, when the light signal travels from the light-transmitting medium into the active medium 27, a portion of the light signal enters the seed portion 34 of the light-transmitting medium 18 and another portion of the light signal enters the active medium 27. The active medium 27 can be grown on the seed portion of the light-transmitting medium 18. The seed layer is optional. For instance, the active medium 27 can be grown or otherwise formed directly on the seed portion of the light-transmitting medium 18

As is evident in FIG. 2A, there is an interface between each facet of the active medium 27 and a facet of the light-transmitting medium 18. The interface can have an angle that is non-perpendicular relative to the direction of propagation of light signals through the waveguide 16 at the interface. In some instances, the interface is substantially perpendicular relative to the base 20 while being non-perpendicular relative to the direction of propagation. The non-perpendicularity of the interface reduces the effects of back reflection. Suitable angles for the interface relative to the direction of propagation include but are not limited to, angles between 80° and 89°, and angles between 80° and 85°.

The optical device includes an active component. In order to simplify FIG. 2A, the details of the active component construction are not shown in FIG. 2A. However, the active component construction is evident from other illustrations such as FIG. 2D. The active component of FIG. 2D is constructed on the portion of the waveguide having the fourth structure. Dashed lines are used in FIG. 2D in order to show the perimeter of doped regions to prevent them from being confused with interfaces between different materials. The interfaces between different materials are illustrated with solid lines. The active component is configured to apply an electric field to the active medium 27 in order to phase and/or intensity modulate the light signals received by the active component.

A ridge 22 of the active medium 27 extends upward from a slab region of the active medium 27. Doped regions 40 are both in the slab regions of the active medium 27 and also in the ridge of the active medium 27. For instance, doped regions 40 of the active medium 27 are positioned on the lateral sides of the ridge 22 of the active medium 27. In some instances, each of the doped regions 40 extends up to the top side of the active medium 27 as shown in FIG. 2D. Additionally, the doped regions 40 extend away from the ridge 22 into the slab region of the active medium 27. The transition of a doped region 40 from the ridge 22 of the active medium 27 into the slab region of the active medium 27 can be continuous and unbroken as shown in FIG. 2D.

Each of the doped regions 40 can be an N-type doped region or a P-type doped region. For instance, each of the N-type doped regions can include an N-type dopant and each of the P-type doped regions can include a P-type dopant. In some instances, the active medium 27 includes a doped region 40 that is an N-type doped region and a doped region 40 that is a P-type doped region. The separation between the doped regions 40 in the active medium 27 results in the formation of PIN (p-type region-insulator-n-type region) junction in the active component.

In the active medium 27, suitable dopants for N-type regions include, but are not limited to, phosphorus and/or arsenic. Suitable dopants for P-type regions include, but are not limited to, boron. The doped regions 40 are doped so as to be electrically conducting. A suitable concentration for the P-type dopant in a P-type doped region includes, but is not limited to, concentrations greater than $1\times10^{15}$ cm$^{-3}$, $1\times10^{17}$ cm$^{-3}$, or $1\times10^{19}$ cm$^{-3}$, and/or less than $1\times10^{17}$ cm$^{-3}$, $1\times10^{19}$ cm$^{-3}$, or $1\times10^{21}$ cm$^{-3}$. A suitable concentration for the N-type dopant in an N-type doped region includes, but is not limited to, concentrations greater than $1\times10^{15}$ cm$^{-3}$, $1\times10^{17}$ cm$^{-3}$, or $1\times10^{19}$ cm$^{-3}$, and/or less than $1\times10^{17}$ cm$^{-3}$, $1\times10^{19}$ cm$^{-3}$, or $1\times10^{21}$ cm$^{-3}$.

Conductors 44 are each positioned on a slab region. In the illustrated embodiment, the conductors are positioned on the slab regions of the active medium 27. The conductors can be thermally conductive and, in some instances, are also electrically conducting. In FIG. 2A dashed lines are used to represent the location of the perimeter of the active medium 27 under the conductors 44. The illustrated conductors are optionally spaced apart from the ridge 22 and optionally include one or more edges that are parallel or substantially parallel to a lateral side of the ridge 22.

Each of the conductors 44 contacts a portion of a doped region 40 that is in the slab region of the active medium 27 and/or in the slab region of light transmitting medium 18. Accordingly, each of the doped regions 40 is doped at a concentration that allows it to provide electrical communication between a conductor 44 and the ridge of the active medium 27. As a result, when the conductors are electrically conductive, electrical energy can be applied to the conductors 44 in order to apply the electric field to the active medium 27. The region of the light-transmitting medium or active medium between the doped regions can be undoped or lightly doped as long as the doping is insufficient for the doped material to act as an electrical conductor that electrically shorts the active component.

The active components of FIG. 1A through FIG. 2D can be operated as a modulator. For instance, when the conductors are electrically conductive, electronics 47 (FIG. 1A) can be employed to apply electrical energy to the conductors 44 so as to form an electrical field in the active medium 27. For instance, the electronics can form a voltage differential between the doped regions that act as a source of the electrical field in the gain medium. The electrical field can be formed without generating a significant electrical current through the active medium 27. The active medium 27 can be a medium in which the Franz-Keldysh effect occurs in response to the application of the electrical field. The Franz-Keldysh effect is a change in optical absorption and optical phase by an active medium 27. For instance, the Franz-Keldysh effect allows an electron in a valence band to be excited into a conduction band by absorbing a photon even though the energy of the photon is below the band gap. To utilize the Franz-Keldysh effect the active region can have a slightly larger bandgap energy than the photon energy of the light to be modulated. The application of the field lowers the absorption edge via the Franz-Keldysh effect and makes absorption possible. The hole and electron carrier wavefunctions overlap once the field is applied and thus generation of an electron-hole pair is made possible. As a result, the active medium 27 can absorb light signals received by the active medium 27 and increasing the electrical field increases the amount of light absorbed by the active medium 27. Accordingly, the electronics can tune the electrical field so as to tune the amount of light absorbed by the active medium 27. As a result, the electronics can intensity modulate the electrical field in order to modulate the light signal. Additionally, the electrical field needed to take advantage of the Franz-Keldysh effect generally does not involve generation of free carriers by the electric field.

Suitable active media 27 for use in a modulator that makes use of the Franz-Keldysh effect include electro-absorption media 27 such as semiconductors. However, the light absorption characteristics of different semiconductors are different. A suitable semiconductor for use with modulators employed in communications applications includes $Ge_{1-x}Si_x$ (germanium-silicon) where x is greater than or equal to zero. In some instances, x is less than 0.05, or 0.01. Changing the variable x can shift the range of wavelengths at which modulation is most efficient. For instance, when x is zero, the modulator is suitable for a range of 1610-1640 nm. Increasing the value of x can shift the range of wavelengths to lower values. For instance, an x of about 0.005 to 0.01 is suitable for modulating in the c-band (1530-1565 nm).

The active components of FIG. 1A through FIG. 2D can be operated as a light sensor when the active medium 27 is a light-absorbing medium. During operation of the active component as a light sensor 29, the electronics apply a reverse bias electrical field across the light-absorbing medium. When the light-absorbing medium absorbs a light signal, an electrical current flows through the light-absorbing medium. As a result, the level of electrical current through the light-absorbing medium indicates receipt of a light signal. Additionally, the magnitude of the current can indicate the power and/or intensity of the light signal. Different light-absorbing media can absorb different wavelengths and are accordingly suitable for use in a light sensor depending on the function of the light sensor. A light-absorbing medium that is suitable for detection of light signals used in communications applications includes, but are not limited to, germanium, silicon germanium, silicon germanium quantum well, GaAs, and InP. Germanium is suitable for detection of light signals having wavelengths in a range of 1300 nm to 1600 nm.

The conductors 44 are positioned over the slab regions from which the ridge of active medium extends. For instance, in the illustrated embodiment, the conductors are positioned over the slab regions of the active medium 27. However, as is evident from FIG. 2A and FIG. 2C, at least one of the conductors extend past the ridge 22 of active medium. As a result, a line that is perpendicular to the direction of propagation of a light signal through the waveguide can be drawn through both the ridge of light transmitting medium 18 and at least one of the conductors without passing through the ridge of active medium.

In the illustrated example, the conductors 44 extend from over the active medium 27 to a position over the light-transmitting medium 18. For instance, a first portion 46 of each conductor 44 is positioned such that the active medium 27 is between the conductor 44 and the base 20 and a second portion 48 of the conductor 44 is positioned such that the active medium 27 is not between the conductor 44 and the base 20. In some instances, the first portion of the conductor 44 is arranged such that a line can be drawn that is perpendicular to a surface of the conductor 44 and also extends through the active medium 27 and in the second portion 48 of the conductor 44, a line can be drawn that is perpendicular to same surface of the conductor 44 while extending through the light-transmitting medium 18 but not through the active medium 27.

Heat is generated as a result of the active medium 27 absorbing light during the operation of the active component. The label of "light signal direction" is used in FIG. 2A to indicate that the direction of propagation for light signals during operation of the active component. The light signal enters the active medium 27 through an input side of the active medium 27 and exits from the active medium 27 through an output side of the active medium 27. Generally, the light absorption is most intense where the light signal first interacts with the electrical field. As a result, light absorption is generally most intense at or near the input side of the active medium 27. The increased light absorption can lead to a hot spot in the active component. When the conductors are thermal conductors, the extension of the conductors 44 from over the active medium 27, across the input side of the active medium 27 to a location over the light-transmitting medium 18 provides a pathway for the heat generated by the active component to be carried away from the active component and accordingly provides cooling of the active component.

When the second portion 48 of the conductors 44 provides heat dissipation, the second portion 48 of the conductors can have dimensions that exceed the dimensions that are commonly used for metal traces designed to carry electrical currents on integrated circuit boards. For instance, the second portion 48 of the conductors 44 have length and width labeled "L" and "W" in FIG. 2A. Suitable values for the length and/or width of a second portion 48 of a conductor 44 include, but are not limited to, values greater than 5 µm, 10 µm, or 20 µm. Accordingly, the second portion 48 of a conductor 44 can have at least one or two dimensions that exceed 5 µm, 10 µm, or 20 µm. As is evident in FIG. 2A, the second portion 48 of a conductor 44 can be a smooth continuation of the first portion 46 of a conductor 44. As a result, the first portion 46 of a conductor 44 can also have at least one or two dimensions that exceed 5 µm, 10 µm, or 20 µm.

Although FIG. 2A through FIG. 2D illustrate both conductors 44 extending beyond the perimeter of the active component and/or the active medium 27, in some instances, only one of the conductors 44 extends beyond the perimeter of the active component and/or the active medium 27. Additionally or alternately, one or more of the conductors 44 can extend across the output side of the active component and/or the output side of the active medium 27 in addition to, or as an alternative to, extending over the input side of the active component and/or the input side of the active medium 27.

Figure 3A:
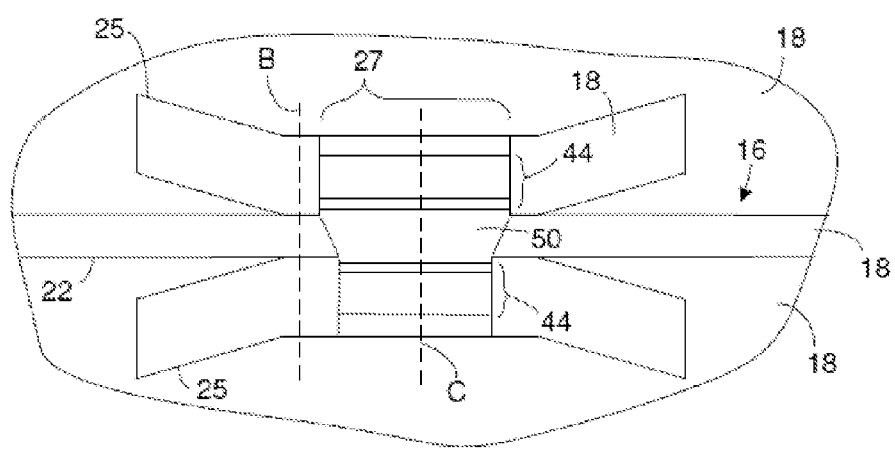
FIG. 3A through FIG. 3C illustrate a portion of a device that includes an embodiment of an active component that is suitable for use as the active component of FIG. 1A and where conductors extend over lateral sides of a ridge of an active medium.
Figure 3B:
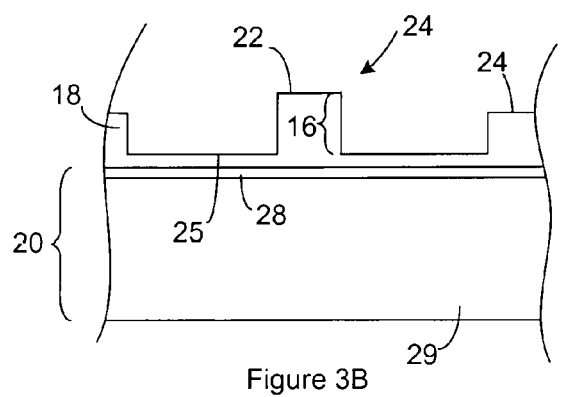
Figure 3C:
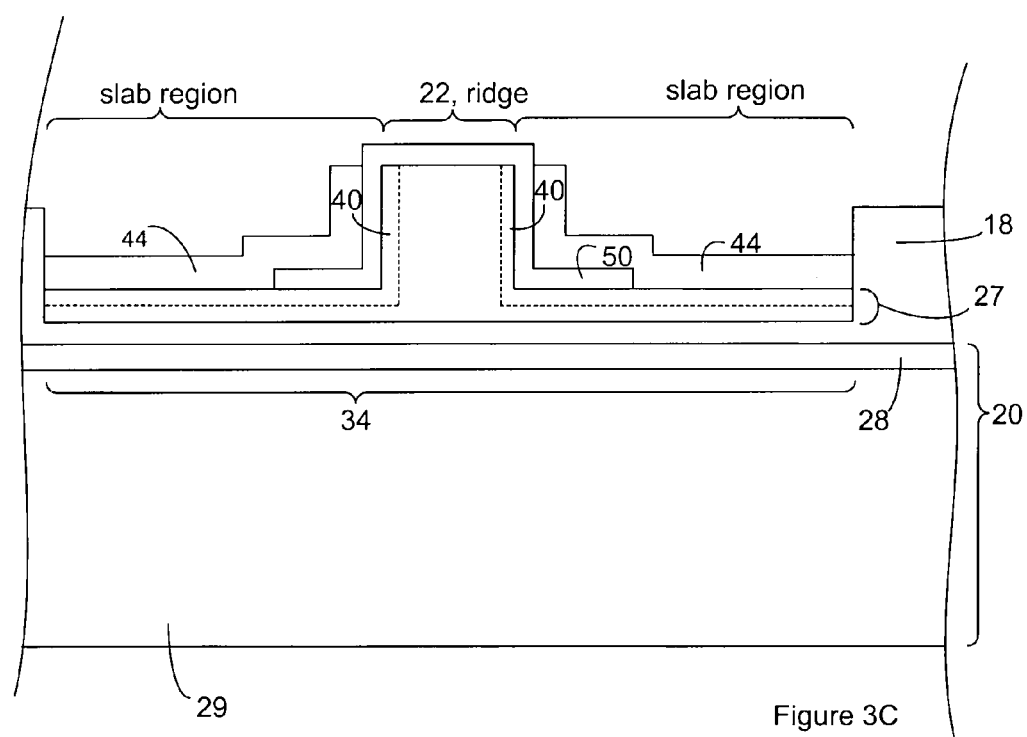

Other arrangements of the conductors 44 can provide cooling to the active component. For instance, the conductors 44 can extend over the lateral sides of the ridge 22. FIG. 3A through FIG. 3C illustrate a portion of a device that includes an embodiment of an active component that is suitable for use as the active component of FIG. 1A and where the conductors 44 extend over the lateral sides of the ridge 22. FIG. 3A is a topview of the device. FIG. 3B is a cross-section of the device shown in FIG. 3A taken along the line labeled B in FIG. 3A. FIG. 3C is a cross-section of the device shown in FIG. 3A taken along the line labeled C in FIG. 3A. The active component of FIG. 3A through FIG. 3C is constructed and operated as disclosed for the active component of FIG. 2A through FIG. 2D but with the addition of a cladding and a different configuration for the conductors.

Each of the illustrated conductors 44 includes a slab portion and a lateral portion. The lateral portion of a conductor 44 is located over a lateral side of the ridge of the active medium 27. For instance, a line can be formed perpendicular to a lateral side of the ridge of the active medium 27 such that the line also extends through the conductor 44 that is over the lateral side of the ridge. The slab portion of a conductor 44 extends away from the ridge and is located over the base. In some instances, the slab portion of a conductor 44 is located over a slab region such as a slab region of the active medium 27 or a slab region of the light-transmitting medium. In the illustrated embodiment, the slab portion of a conductor 44 is located over a slab region of the active medium 27. As a result, a line can be formed perpendicular to a surface of a slab region such that the line extends through the slab portion of the conductor 44 that is over the slab region of the active medium 27.

A cladding 50 is positioned over the ridge 22 of the active medium 27. The location of the ridge 22 of the active medium 27 beneath the cladding 50 is shown by dashed lines in FIG. 3A. A portion of the cladding 50 is located between the lateral portion of each conductor 44 and a lateral side of the ridge of the active medium 27. For instance, a line can be formed perpendicular to a lateral side of the ridge of the active medium 27 such that the line also extends through the cladding 50 and the conductor 44. Another portion of the cladding 50 is also optionally positioned between a slab region and at least a portion of the slab portion of the conductor 44. For instance, a line can be formed perpendicular to a slab region such that the line also extends through the cladding 50 and the conductor 44.

In many instances, the conductors 44 are formed of a metal. When many metals are in direct contact with the active medium 27, the metals can absorb light traveling through the active medium 27. As a result, the cladding 50 can be a material that is appropriate for being in contact with the active medium 27. For instance, the portion of the cladding 50 that contacts the active medium 27 can have a lower index of refraction than the active medium 27 and can accordingly reflect light signals from the active medium 27 back into the active medium 27.

The cladding 50 can be a single layer of material or can include more than one layer of material. Suitable materials for one or more of the cladding layers included in the cladding 50 include, but are not limited to, silicon nitride, silica, and polyimide. In one example, the cladding 50 includes a first cladding layer and a second cladding layer with the first cladding layer being between the second cladding layer and active medium 27. In this example, the first cladding layer can be an oxide and the second cladding layer can be a nitride. Suitable oxides include, but are not limited to, oxides that include silicon such as Sift. Suitable nitrides include, but are not limited to, nitrides that include silicon such as $Si_3N_4$.

In some instances, an electrical pathway is provided from each conductor 44 to one of the doped regions 40 in order to provide electrical communication between the conductors 44 and the ridge 22 of the active medium 27. The cladding 50 can be electrically insulating and the electrical pathway can bypass the cladding 50. For instance, each of the conductors shown in FIG. 3A through FIG. 3C is in direct contact with one of the doped regions 40. The contact between a conductor 44 and of the doped region 40 provides the desired electrical pathway. The electrical pathway can be spaced apart from the ridge 22 of the active medium 27. For instance, the contact between the conductors 44 and the doped regions 40 occurs at a location that is spaced apart from the ridge 22 of active medium 27. The doped regions can provide electrical communication between one of the conductors 44 and the ridge 22 of active medium 27. Accordingly, electronics in electrical communication with the conductors 44 can apply electrical energy to the conductors 44 in order to operate the active component as described above.

Figure 4A:
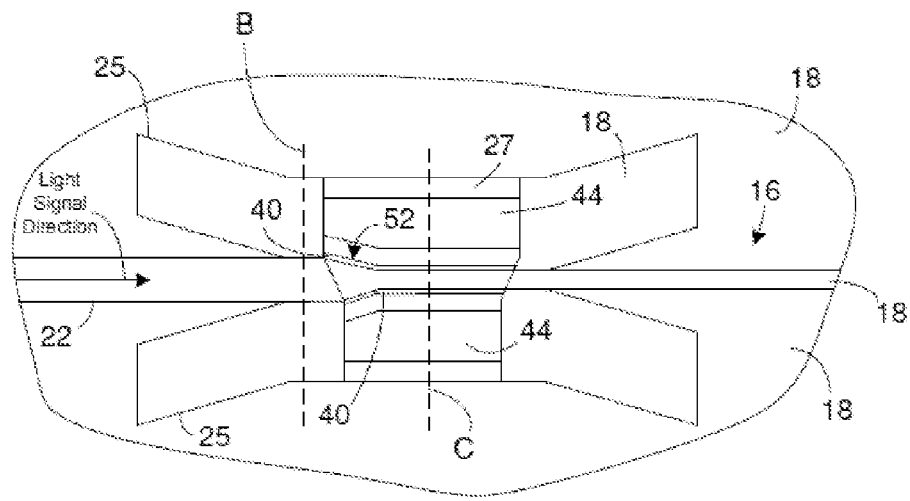
FIG. 4A through FIG. 4C illustrate a portion of a device that includes an embodiment of an active component that is suitable for use as the active component of FIG. 1A and where a ridge of active medium includes a lateral taper.
Figure 4B:
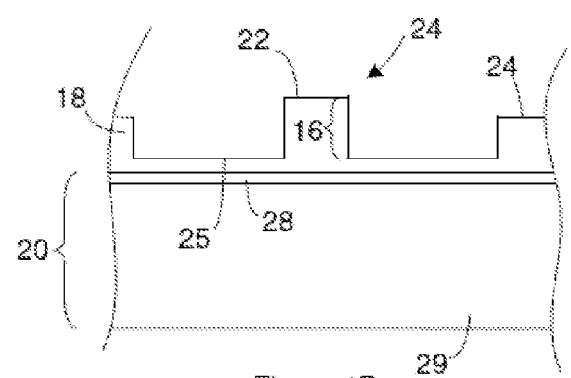
Figure 4C:
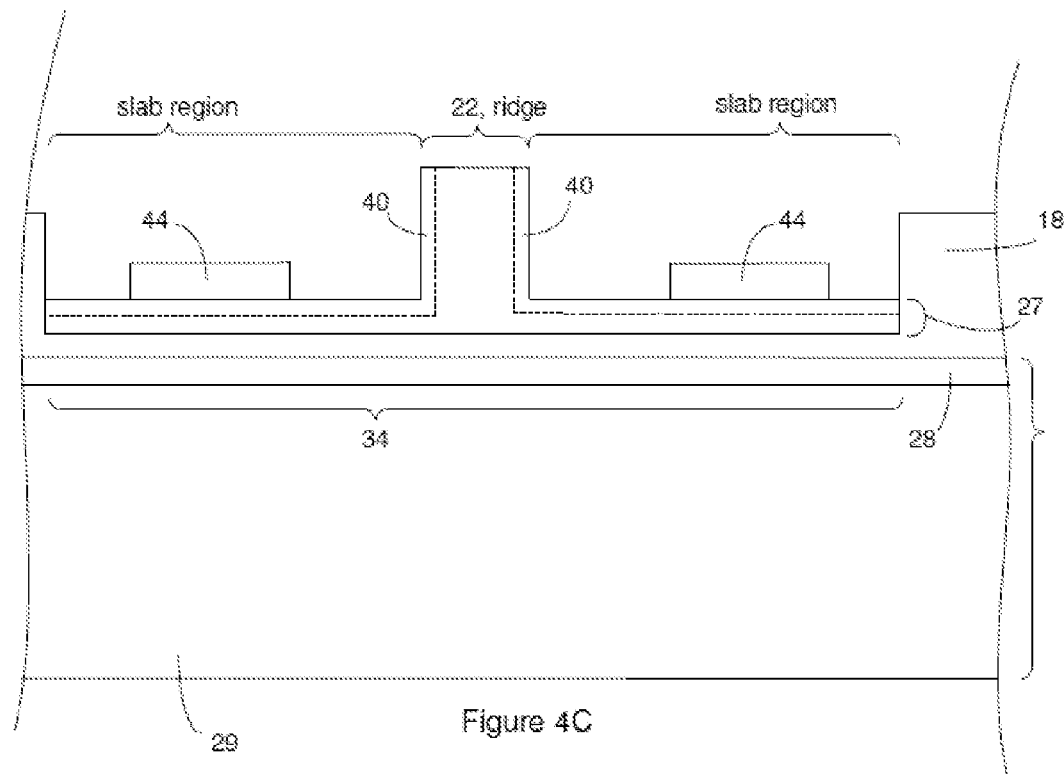

Other modifications to the above active components can be used to address heat generated within the active component. For instance, the ridge 22 of the active medium 27 can include one or more lateral tapers and/or one or more vertical tapers. As an example, FIG. 4A through FIG. 4C illustrate a portion of a device that includes an embodiment of an active component that is suitable for use as the active component of FIG. 1A and where the ridge of the active medium includes a lateral taper. FIG. 4A is a topview of the device. FIG. 4B is a cross-section of the device shown in FIG. 4A taken along the line labeled B in FIG. 4A. FIG. 4C is a cross-section of the device shown in FIG. 4A taken along the line labeled C in FIG. 4A. The active component of FIG. 4A through FIG. 4C is constructed and operated as disclosed for the active component of FIG. 2A through FIG. 2D but with a different configuration for the conductors and the addition of a taper to the portion of the waveguide in the active component.

The ridge 22 of the active medium 27 includes a lateral taper 52 in that the separation between the lateral sides of the ridge changes. The ridge 22 of the active medium 27 can also optionally include a vertical taper (not shown). Although the taper 52 is shown in only a portion of the ridge 22 of the active medium 27, the taper 52 can extend the full length of the ridge 22 of the active medium 27. In some instances, the taper 52 is an adiabatic taper.

The taper 52 is located within the active region of the active component. For instance, the location of the taper 52 along the ridge 22 is such that the electrical field that is formed during operation of the active component is formed within the tapered portion of the ridge 22 of the active medium 27. As a result, in some instances, the taper is located such that electrical current flows through the ridge 22 during operation of the active component. Accordingly, the taper 52 can be positioned in the portion of the waveguide where the modulation of the light signal occurs or where detection of light signals occurs.

The label of "light signal direction" is used in FIG. 4A to indicate that the direction of propagation for light signals during operation of the active component. The light signal enters the active medium 27 through an input side of the active medium 27 and exits from the active medium 27 through an output side of the active medium 27. The taper 52 is arranged such that the waveguide becomes smaller as the light signal travels further into the active medium 27.

The taper 52 causes the temperature rise within the active component to be spread more evenly along the ridge of the active medium 27 because the heat generated in the region where the greatest amount of light absorption occurs is spread over a wider waveguide and accordingly reduces the maximum temperature increase. As a result, the taper 52 can reduce the formation of hot spots within the active component.

Figure 5A:
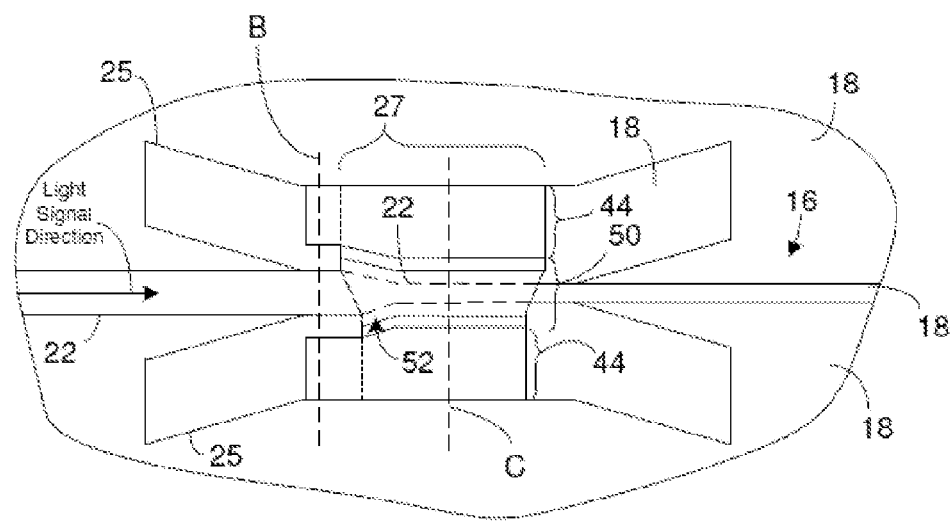
FIG. 5A through FIG. 5C illustrate a portion of a device that includes an embodiment of an active component that combines multiple heat control features.
Figure 5B:
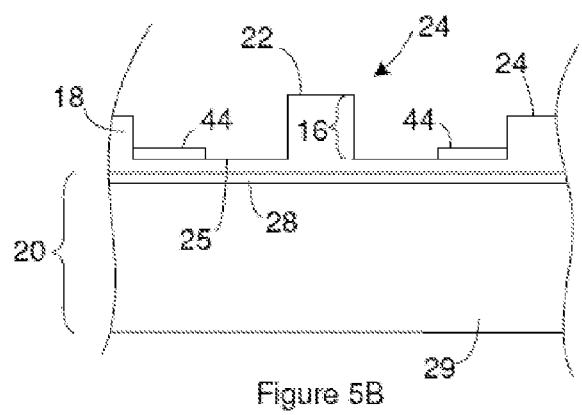
Figure 5C:
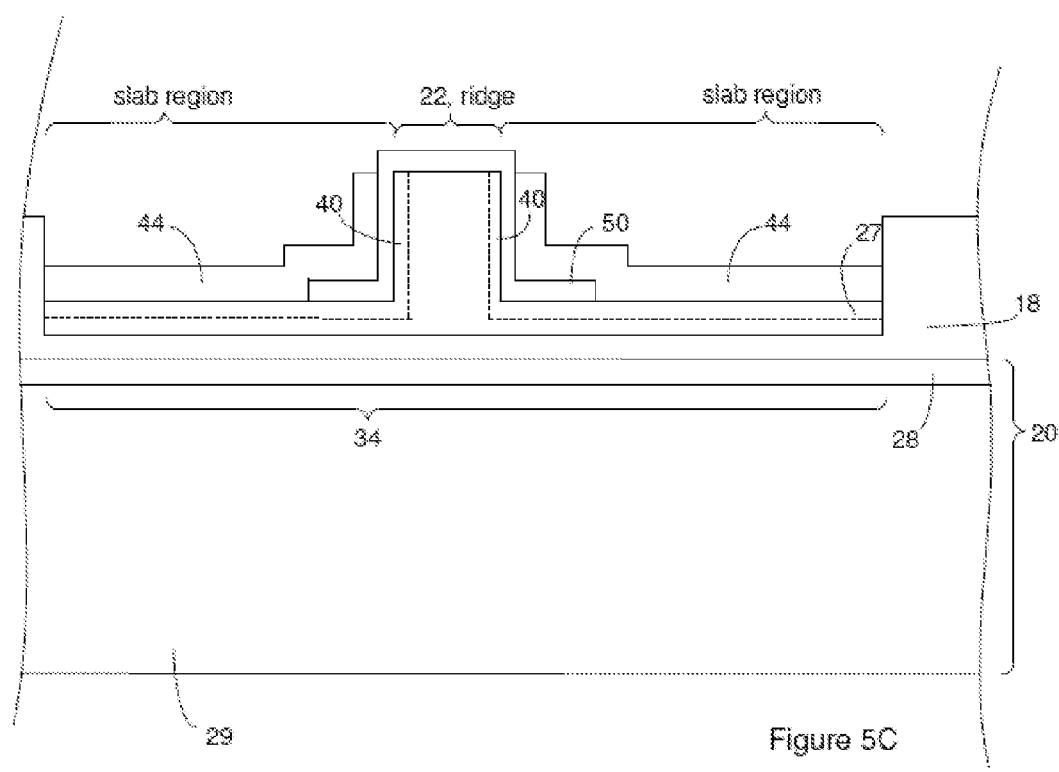

The heat control features disclosed above can be combined in order to increase control of heat generated within the active component. For instance, the active component can include one, two, three, or four heat control features selected from the group consisting of: extending one or more conductors from the active component to a location outside of the active component; extending one or more conductors from a location over the active medium 27 to a location beyond the active medium 27; placing one or more conductors over a lateral side of the ridge 22 of the active medium 27; and including one or more tapers in the ridge 22 of the active medium 27. As an example, FIG. 5A through FIG. 5C illustrate a portion of a device that includes an embodiment of an active component that combines all of these heat control features. FIG. 5A is a topview of the device. FIG. 5B is a cross-section of the device shown in FIG. 5A taken along the line labeled B in FIG. 5A. FIG. 5C is a cross-section of the device shown in FIG. 5A taken along the line labeled C in FIG. 5A. The active component of FIG. 5A through FIG. 5C is constructed and operated as disclosed for the active component of FIG. 2A through FIG. 2D but with a different configuration for the conductors and the addition of the taper to the portion of the waveguide in the active component. The location of the ridge 22 of the active medium 27 beneath the cladding 50 is shown by dashed lines in FIG. 3A.

The active component of FIG. 5A through FIG. 5C includes conductors 44 that extend from the active component to a location outside of the active component. The conductors also extend from a location over the active medium 27 to a location beyond the active medium 27. Additionally, the conductors are each located over a lateral side of the ridge 22. Further, the ridge 22 of the active medium 27 includes a lateral taper located within the active component.

Figure 6:
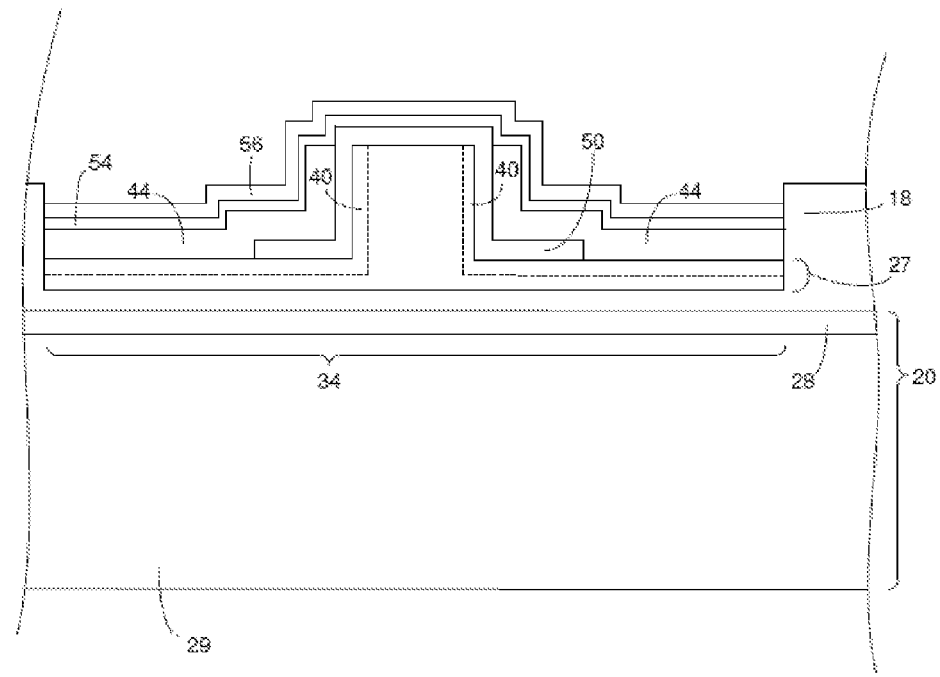
FIG. 6 is a cross section of an active component having two additional layers of material formed on an active component constructed according to FIG. 3C or FIG. 5C.

One or more layers of material can optionally be formed on the above active components. As an example, FIG. 6 is a cross section of an active component having two additional layers of material formed on an active component constructed according to FIG. 3C or FIG. 5C. An upper cladding 54 is positioned between the active component and a passivation layer 56. The upper cladding 54 can be in contact with the ridge 22 of the active medium 27. In some instances, the upper cladding 54 is also in contact with the ridge of the light-transmitting medium. As a result, the upper cladding 54 can include or consist of a material with a lower index of refraction than the light-transmitting medium and/or the active medium 27. Suitable materials for the upper cladding 54 and/or the passivation layer 56 include, but are not limited to, oxides and nitrides. Suitable oxides include, but are not limited to, oxides that include silicon such as Sift. Suitable nitrides include, but are not limited to, nitrides that include silicon such as $Si_3N_4$. Although not shown in FIG. 6, in some instances, a window or opening through the upper cladding 54 and passivation layer 56 that leaves a portion of the conductors 44 exposed. The window or opening can be used to connect the external electronics to the conductors 44.

Other modulator and/or light sensor constructions can be used with the above heat control features. Examples of other suitable modulator constructions can be found in U.S. patent application Ser. No. 12/653,547, filed on Dec. 15, 2009, entitled "Optical Device Having Modulator Employing Horizontal Electrical Field," and U.S. patent application Ser. No. 13/385,774, filed on Mar. 4, 2012, entitled "Integration of Components on Optical Device," each of which is incorporated herein in its entirety. U.S. patent application Ser. Nos. 12/653,547 and 13/385,774 also provide additional details about the fabrication, structure and operation of these modulators. In some instances, the modulator is constructed and operated as shown in U.S. patent application Ser. No. 11/146,898; filed on Jun. 7, 2005; entitled "High Speed Optical Phase Modulator," and now U.S. Pat. No. 7,394,948; or as disclosed in U.S. patent application Ser. No. 11/147,403; filed on Jun. 7, 2005; entitled "High Speed Optical Intensity Modulator," and now U.S. Pat. No. 7,394,949; or as disclosed in U.S. patent application Ser. No. 12/154,435; filed on May 21, 2008; entitled "High Speed Optical Phase Modulator," and now U.S. Pat. No. 7,652,630; or as disclosed in U.S. patent application Ser. No. 12/319,718; filed on Jan. 8, 2009; and entitled "High Speed Optical Modulator;" or as disclosed in U.S. patent application Ser. No. 12/928,076; filed on Dec. 1, 2010; and entitled "Ring Resonator with Wavelength Selectivity;" or as disclosed in U.S. patent application Ser. No. 12/228,671, filed on Aug. 13, 2008, and entitled "Electrooptic Silicon Modulator with Enhanced Bandwidth;" or as disclosed in U.S. patent application Ser. No. 12/660,149, filed on Feb. 19, 2010, and entitled "Reducing Optical Loss in Optical Modulator Using Depletion Region;" each of which is incorporated herein in its entirety. Examples of other suitable light sensor constructions can be found in U.S. patent application Ser. No. 12/380,016, filed on Feb. 19, 2009, entitled "Optical Device Having Light Sensor Employing Horizontal Electrical Field, issued as U.S. Pat. No. 8,053,790; and also in U.S. patent application Ser. No. 12/584,476, filed on Sep. 4, 2009, entitled "Optical Device Having Light Sensor Employing Horizontal Electrical Field, issued as U.S. Pat. No. 8,093,080; each of which is incorporated herein in its entirety. The disclosures of these applications provide techniques for fabrication of the above active component. Heat control features such as conductor placement and lateral tapers can be formed using traditional integrated circuit fabrication technologies. A review of the modulators and/or light sensors disclosed in these applications shows that the slab regions of the active medium 27 are optional and/or the seed portion 34 of the light-transmitting medium 18 is optional. Accordingly, the slab regions can be regions of the active medium 27, light-transmitting medium 18, base 20, or layer of material on the base 20. As a result, in some instances, the slab portion of one or more of the conductors 44 is positioned over or in contact with the seed portion 34 of the light-transmitting medium 18, over or in contact with the base 20, over or in contact with one or more layers of material between the slab portion of the conductor 44 and the base 20, or over or in contact with one or more layers of material between the slab portion of the conductor 44 and the seed portion 34 of the light-transmitting medium 18. Additionally or alternately, in some instances, a portion of the cladding is positioned over or in contact with the seed portion 34 of the light-transmitting medium 18; over or in contact with the base 20; over or in contact with one or more layers of material between the slab portion of the conductor 44 and the base 20; or over or in contact with one or more layers of material between the slab portion of the conductor 44 and the seed portion 34 of the light-transmitting medium 18.

Figure 7:
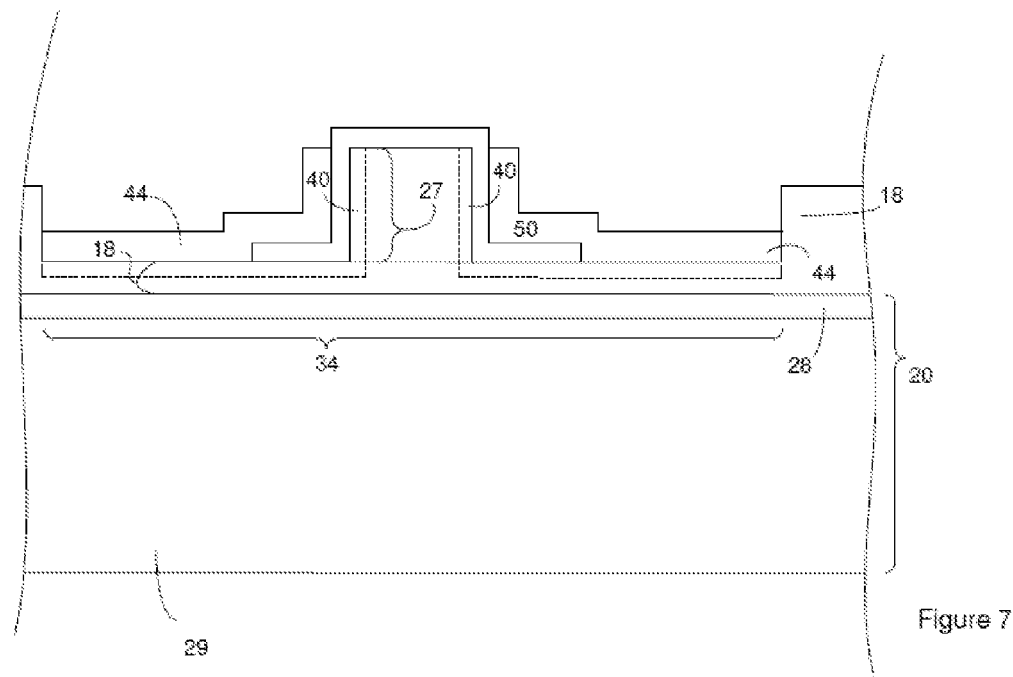
FIG. 7 is a cross section of an active component constructed according to FIG. 3C or FIG. 5C but without slab regions of an active medium.

FIG. 7 is presented in order to illustrate adaptation of the above heat control features to other active component constructions. FIG. 7 is a cross section of an active component constructed according to FIG. 3C or FIG. 5C but without slab regions of the active medium 27.

Each of the illustrated conductors 44 includes a slab portion and a lateral portion. The slab portion of a conductor 44 is located over the base 20 and over the light-transmitting medium 18. For instance, a line can be formed perpendicular to a surface of the base 20 and/or the light-transmitting medium 18 such that the line extends through the slab portion of the conductor 44. The lateral portion of a conductor 44 is located over a lateral side of the ridge of the active medium 27. For instance, a line can be formed perpendicular to a lateral side of the ridge of the active medium 27 such that the line also extends through the conductor 44 that is over the lateral side of the ridge.

A cladding 50 is positioned over the ridge 22 of the active medium 27. A portion of the cladding 50 is located between the lateral portion of each conductor 44 and a lateral side of the ridge of the active medium 27. For instance, a line can be formed perpendicular to a lateral side of the ridge of the active medium 27 such that the line also extends through the cladding 50 and the conductor 44. Another portion of the cladding 50 is also optionally positioned between the base 20 and at least a portion of the slab portion of the conductor 44 and/or between the light-transmitting medium 18 and at least a portion of the slab portion of the conductor 44. For instance, a line can be formed perpendicular to a surface of the base 20 such that the line also extends through the cladding 50 and the conductor 44. Additionally or alternately, a line can be formed perpendicular to a surface of the light-transmitting medium 18 such that the line also extends through the cladding 50 and the conductor 44.

Doped areas of the active medium 27 and the light-transmitting medium 18 combine to form the doped regions 40 that provide electrical communication between conductors 44 and the ridge 22 of the active medium 27. An electrical pathway is provided from each conductor 44 to one of the doped regions 40 in order to provide electrical communication between the conductors 44 and the ridge 22 of the active medium 27. The cladding 50 can be electrically insulating and the electrical pathway can bypass the cladding 50. For instance, each of the conductors 44 shown in FIG. 7 is in direct contact with one of the doped regions 40. The contact between a conductor 44 and of the doped region 40 provides the desired electrical pathway around the cladding. The electrical pathway can be spaced apart from the ridge 22 of the active medium 27. For instance, the contact between the conductors 44 and the doped regions 40 occurs at a location that is spaced apart from the ridge 22 of active medium 27. The doped regions can provide electrical communication between one of the conductors 44 and the ridge 22 of conductor 44. Accordingly, electronics in electrical communication with the conductors 44 can apply electrical energy to the conductors 44 in order to operate the active component as described above.

Although the heat control features of the conductors being over lateral sides of the ridge 22 of the active medium 27 is evident in FIG. 7, the illustrated active component can include one or more of the other heat control features. Further, the conductors need not be over lateral sides of the ridge 22 when the active component includes one or more of the other heat control features. For instance, the active component can include one, two, three, or four heat control features selected from the group consisting of: extending one or more conductors from the active component to a location outside of the active component; extending one or more conductors from a location over the active medium 27 to a location beyond the active medium 27; placing one or more conductors over a lateral side of the ridge 22 of the active medium 27; and including one or more tapers in the ridge 22 of the active medium 27.

The above conductors 44 are disclosed as providing electrical conduction and/or thermal conduction. However, in some instances, the conductors 44 can be present only for thermal conduction and accordingly do not need to carry current during the operation of the active component. As a result, the conductors 44 do not need to be electrical conductors. Diamond and certain classes of epoxy provide high levels of thermal conductivity without substantial electrical conduction and are accordingly suitable for these purposes. Suitable materials for the conductors include, but are not limited to, materials having a thermal conductivity greater than 100, 200, or 300 W/(m·K). Examples conductors 44 include or consist of materials such as metals, epoxies, and dielectrics such as diamond. Particular examples of a conductor include aluminum, gold, diamond. Aluminum has a thermal conductivity of 205 W/m·K and gold has a thermal conductivity of 310 W/m·K. Diamond has a thermal conductivity has a thermal conductivity of 1000 W/m·K but is not electrically conducting.

Although some of the above heat control features are described relative to a particular direction of a light signal, the above active components can be employed to modulate light signals traveling in either direction or in both directions.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. An optical device, comprising:
   a waveguide positioned on a base and an active component positioned on the base,
      the active component including a ridge of an active medium positioned on the base, the ridge of active medium including lateral sides between a top and a bottom, the bottom of the ridge being between the top of the ridge and the base,
      the waveguide configured to guide a light signal through the active component such that the light signal is guided through the ridge of the active medium; and
   a thermal conductor that includes a lateral portion and a slab portion, the lateral portion positioned over a lateral side of the ridge of the active medium and the slab portion extending away from the ridge of active medium.

2. The device of claim 1, wherein an electrical insulator is between the lateral portion of the thermal conductor and the ridge.

3. The device of claim 2, wherein the thermal conductor is in electrical communication with the ridge of active medium along an electrical pathway that bypasses the electrical insulator at a location that is spaced apart from the ridge.

4. The device of claim 1, wherein the component is a modulator.

5. The device of claim 4, wherein the modulator is a Franz-Keldysh modulator that uses the Franz-Keldysh effect to modulate light signals.

6. The device of claim 1, wherein the component is a light sensor.

7. The device of claim 1, wherein the thermal conductor is positioned such that the active medium is between the thermal conductor and the base and extends to a location where the active medium is not between the thermal conductor and the base.

8. The device of claim 7, wherein the ridge of the active medium extends upwards from slab regions of the active medium and the slab portion of the thermal conductor is over one of the slab regions.

9. The device of claim 8, wherein the portion of the thermal conductor where the active medium is not between the thermal conductor and the base has at least one dimension larger than 5 μm.

10. The device of claim 1, wherein the ridge of active medium includes a taper.

11. The device of claim 10, wherein the taper is positioned such that an electrical current flows through the taper during operation of the active component.

12. The device of claim 10, wherein the taper is a lateral taper where a distance between lateral sides of the ridges changes.

13. An optical device, comprising:
a waveguide positioned on a base and an active component positioned on the base,
the active component including a ridge of an active medium positioned on the base, the waveguide configured to guide a light signal through the active component such that the light signal is guided through the ridge of the active medium; and
a thermal conductor positioned such that the active medium is between the thermal conductor and the base and extending to a location where the active medium is not between the thermal conductor and the base,
the thermal conductor having at least one dimension larger than 5 µm.

14. The device of claim 13, wherein the thermal conductor has at least two dimensions larger than 5 µm.

15. The device of claim 13, wherein the thermal conductor is spaced apart from the ridge.

16. The device of claim 13, wherein at least a portion of the ridge of active medium including a taper.

17. The device of claim 16, wherein the taper is positioned such that an electrical current flows through the taper during operation of the active component.

* * * * *